C. SPRUYT.
DEVICE TO ASSIST COWS IN CALVING.
APPLICATION FILED FEB. 6, 1919.

1,326,800.

Patented Dec. 30, 1919.

WITNESSES

INVENTOR
CORNELIUS SPRUYT
BY
ATTORNEYS

UNITED STATES PATENT OFFICE.

CORNELIUS SPRUYT, OF COLEMAN, WISCONSIN.

DEVICE TO ASSIST COWS IN CALVING.

1,326,800.  Specification of Letters Patent.  Patented Dec. 30, 1919.

Application filed February 6, 1919. Serial No. 275,390.

*To all whom it may concern:*

Be it known that I, CORNELIUS SPRUYT, a citizen of the United States, and a resident of Coleman, in the county of Marinette and State of Wisconsin, have invented a new and Improved Device to Assist Cows in Calving, of which the following is a description.

My invention relates to a device for affording assistance to animals in the act of delivering their young, and is more particularly intended for use with cows, it being well known to breeders that valuable cows are not infrequently lost because unable to deliver themselves of their calves.

The general object of my invention is to provide a practical device for the indicated purpose and adapted to be expeditiously positioned and adjusted for use, as well as unfailingly operated to carry out its purpose without danger or injury to the cow or its calf.

Reference is to be had to the accompanying drawing forming part of this specification, it being understood that the drawing is merely illustrative of one example of the invention.

Figure 1:
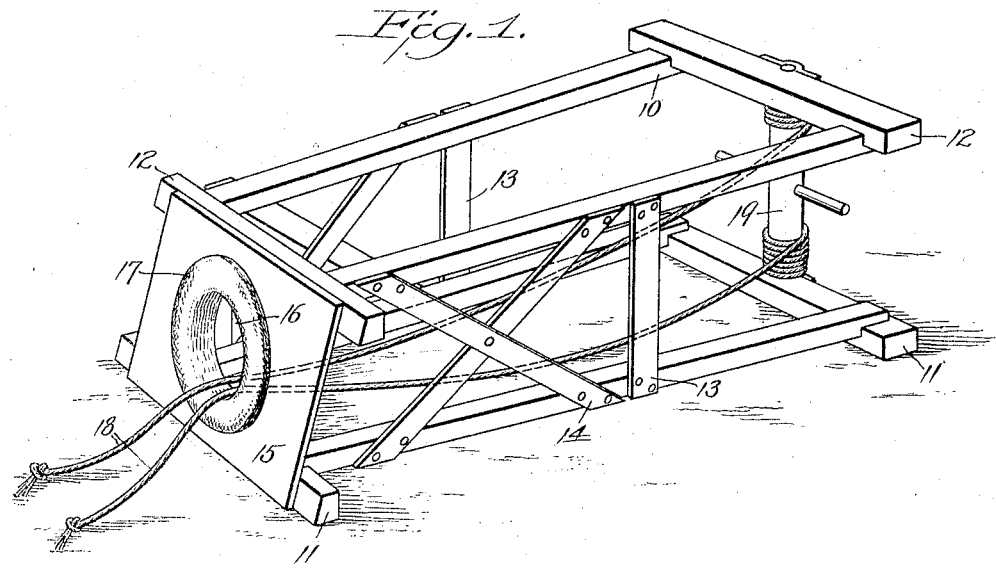
Figure 1 is a perspective view of a device embodying my invention.
Figure 2:
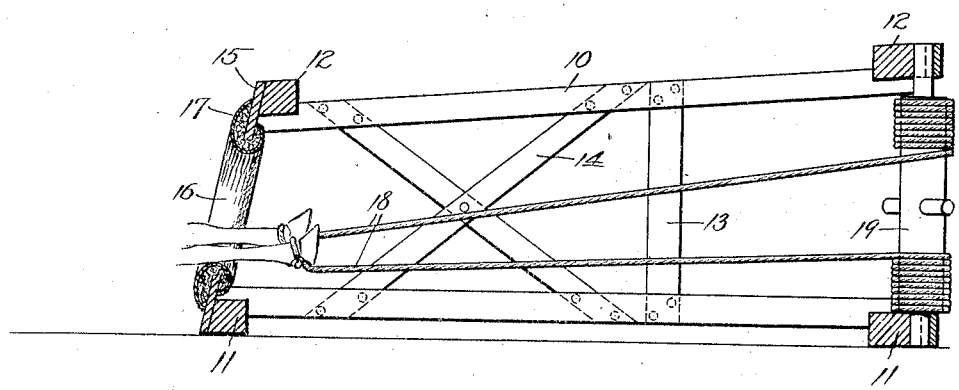
Fig. 2 is a longitudinal vertical section.

In carrying out my invention in practice, a suitable elongated frame structure or body is provided and here designated generally by the numeral 10, the illustrated form presenting longitudinal bars at the top and bottom, extending respectively between sills 11 and top cross bars 12 provided at the front and rear ends of the structure. The top and bottom longitudinal bars are in practice suitably braced, there being shown uprights 13 at the opposite sides and X-braces 14 at the sides between said uprights and the front of the structure.

The front of the structure preferably and advantageously is made slanting in order that the device may be properly positioned regardless of the posture of the cow. At said front end is a board 15 secured to the front sill 11 and the adjacent top cross bar 12 and it presents a central opening 16 through which a calf may be drawn. In order to prevent any injury to the cow or the calf I provide a cushion 17 on the front and extending about the opening 16.

Ropes 18 or like flexible elements are provided adapted to be fastened to two legs of the calf and they extend from a winding means preferably in the form of a capstan 19 turning at its upper and lower ends respectively in the rear cross bar 12 and rear sill 11. Thus, the ropes may pay out from the capstan and be passed forwardly through the opening 16 and upon being tied to the calf the ropes may be wound in to draw the calf rearwardly through the opening 16.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

A device of the class described including a portable structure adapted to be positioned with its front end adjacent to the animal to be assisted, and comprising longitudinal base and top bars and brace and transverse bars connecting the same, said structure having a closed front end secured to the front base and top transverse bars, the top of said front slanting rearwardly, there being an opening leading rearwardly through said closed front end, a cushion on the closed front end extending about the opening therein through which opening a calf may be drawn, and winding means for drawing the calf rearwardly through said opening.

CORNELIUS SPRUYT.